US011186167B2

(12) United States Patent
Anderson

(10) Patent No.: US 11,186,167 B2
(45) Date of Patent: Nov. 30, 2021

(54) UTV FUEL TANK WITH STORAGE

(71) Applicant: SUPERTANKS, LLC, Idaho Falls, ID (US)

(72) Inventor: Klint Anderson, Rigby, ID (US)

(*) Notice: Subject to any disclaimer, the term of this patent is extended or adjusted under 35 U.S.C. 154(b) by 235 days.

(21) Appl. No.: 16/657,370

(22) Filed: Oct. 18, 2019

(65) Prior Publication Data

US 2020/0122571 A1 Apr. 23, 2020

Related U.S. Application Data

(60) Provisional application No. 62/748,110, filed on Oct. 19, 2018.

(51) Int. Cl.
*B60K 15/06* (2006.01)
*B60K 15/03* (2006.01)
*B60K 15/063* (2006.01)

(52) U.S. Cl.
CPC ........ *B60K 15/06* (2013.01); *B60K 15/03006* (2013.01); *B60K 2015/03019* (2013.01); *B60K 2015/0638* (2013.01)

(58) Field of Classification Search
CPC ... B60R 11/06; B60K 15/03006; B60K 15/06; Y10T 137/6881; B60Y 2220/20
See application file for complete search history.

(56) References Cited

U.S. PATENT DOCUMENTS

| | | | | |
|---|---|---|---|---|
| 1,404,484 A * | 1/1922 | Schoonmaker | ......... | B60R 11/06 296/37.15 |
| 3,696,979 A * | 10/1972 | Erickson | ................ | B60K 15/06 224/309 |
| 3,854,621 A * | 12/1974 | Parry | ...................... | B60R 11/06 220/554 |
| 4,911,296 A * | 3/1990 | Hart, Jr. | ................. | B25H 3/023 206/373 |
| 5,054,864 A * | 10/1991 | Cesena | ................... | B60R 11/06 312/328 |
| 5,447,110 A * | 9/1995 | Brown | .................... | B60R 11/06 141/2 |
| 6,039,203 A * | 3/2000 | McDaniel | ........ | B60K 15/03006 220/562 |
| 7,611,185 B2 * | 11/2009 | Allen | ........................ | B60P 3/14 222/192 |
| 8,393,665 B2 * | 3/2013 | Villano | ................... | B60R 11/06 296/37.6 |

* cited by examiner

*Primary Examiner* — Kevin F Murphy
(74) *Attorney, Agent, or Firm* — Schmeiser, Olsen & Watts LLP

(57) ABSTRACT

A UTV spare fuel tank is provided. The spare fuel tank includes a main body and a lid coupled to the main body. The main body may include a storage compartment and a fueling compartment accessible by opening the lid. The spare fuel tank include a fuel reservoir formed between an outer wall and an inner wall of the main body. The outer wall forms the outer dimension of the main body and the inner wall forms the storage compartment and the fueling compartment. The spare fuel tank may also include brackets and lift members coupled to the main body and extending below a bottom surface of the main body to lift the main body off of a storage shelf to form a gap between the bottom surface and the storage shelf.

10 Claims, 6 Drawing Sheets

UTV FUEL TANK WITH STORAGE

CROSS REFERENCE TO RELATED APPLICATION[S]

This application claims priority to U.S. Provisional Patent Application entitled "UTV FUEL TANK WITH STORAGE," Ser. No. 62/748,110, filed Oct. 19, 2018, the disclosure of which is hereby incorporated entirely herein by reference.

BACKGROUND OF THE INVENTION

Technical Field

This invention relates generally to a fuel tank for a UTV and more particularly to a spare fuel tank for a UTV with storage space.

State of the Art

The utility task vehicle ("UTV") is becoming wide spread. They are used recreationally, for work purposes, for hunting, racing and the like. UTVs commonly have the ability to switch from 2 wheel drive to 4 wheel drive, thereby allowing the vehicle to traverse different types of terrain. Often the UTVs are used in areas where the ability to refuel is limited and spare fuel tanks must be carried in order to provide the necessary fuel to travel to and from certain destinations. Typically, the owner carries conventional spare fuel tanks on the rear storage shelf of the UTV and then removes the spare fuel tank to fill the UTV's gas tank. These conventional spare fuel tanks are limited in that you generally need to strap them onto the rear storage area. Also, the rear storage area is above the engine of the UTV and the surface can get extremely hot. This can be a danger by overheating and risking combustion of the fuel within the spare fuel tank.

Accordingly, there is a need for an improved spare fuel tank for use with a UTV.

SUMMARY OF THE INVENTION

The present invention relates to a UTV spare fuel tank with storage.

An embodiment includes a UTV spare fuel tank comprising: a main body and a lid coupled to the main body, the lid moveable between a closed position and an open position; a storage compartment and a fueling compartment formed in the main body, the storage and fueling compartments accessible when the lid is in the open position; a fuel reservoir formed between an outer wall and an inner wall of the main body, wherein the outer wall forms the outer dimension of the main body and the inner wall forms the storage compartment and the fueling compartment; and brackets and lift members coupled to the main body and extending below a bottom surface of the main body, wherein the bottom surface of the main body is lifted off of a storage shelf of a UTV by the brackets and the lift members to form a gap between the bottom surface and the storage shelf for insulating the main body The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a UTV spare fuel tank with storage, wherein the spare fuel tank is mountable to a rear storage shelf of a UTV.

Figure 1:
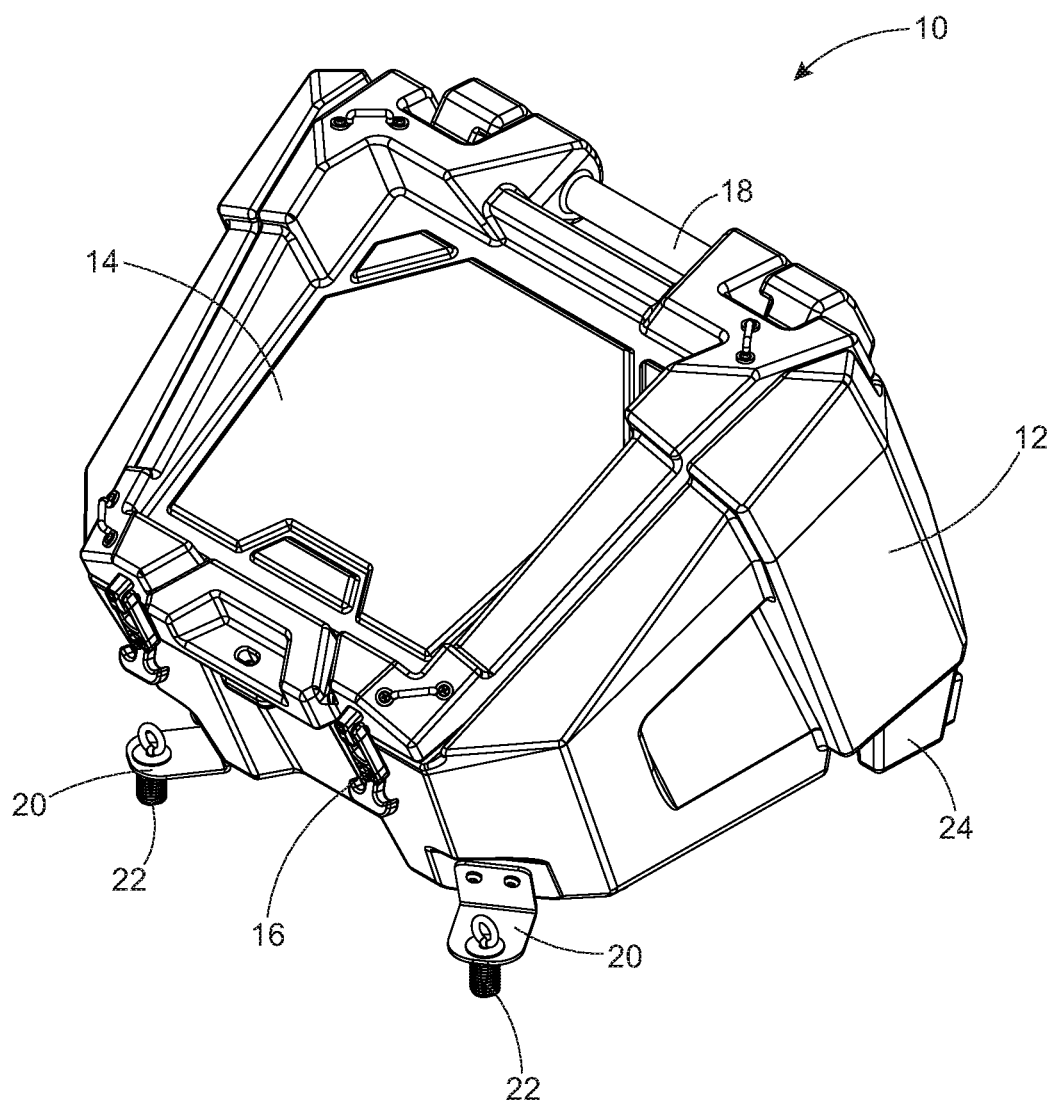
FIG. 1 is a top front perspective view of a UTV spare fuel tank with storage showing a lid in a closed position according to an embodiment.
Figure 2:
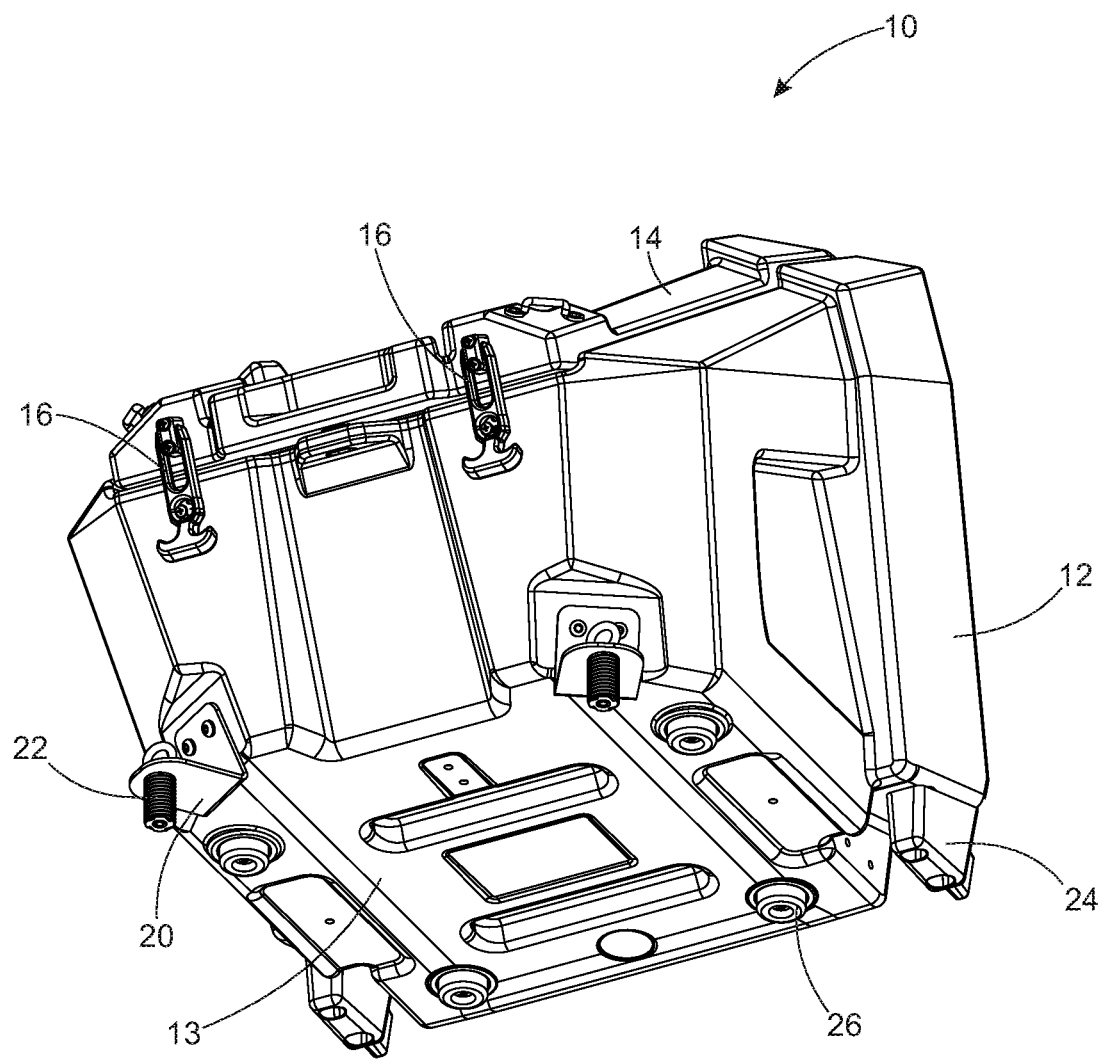
FIG. 2 is a bottom perspective view of a UTV spare fuel tank with storage showing a lid in a closed position according to an embodiment.
Figure 3:
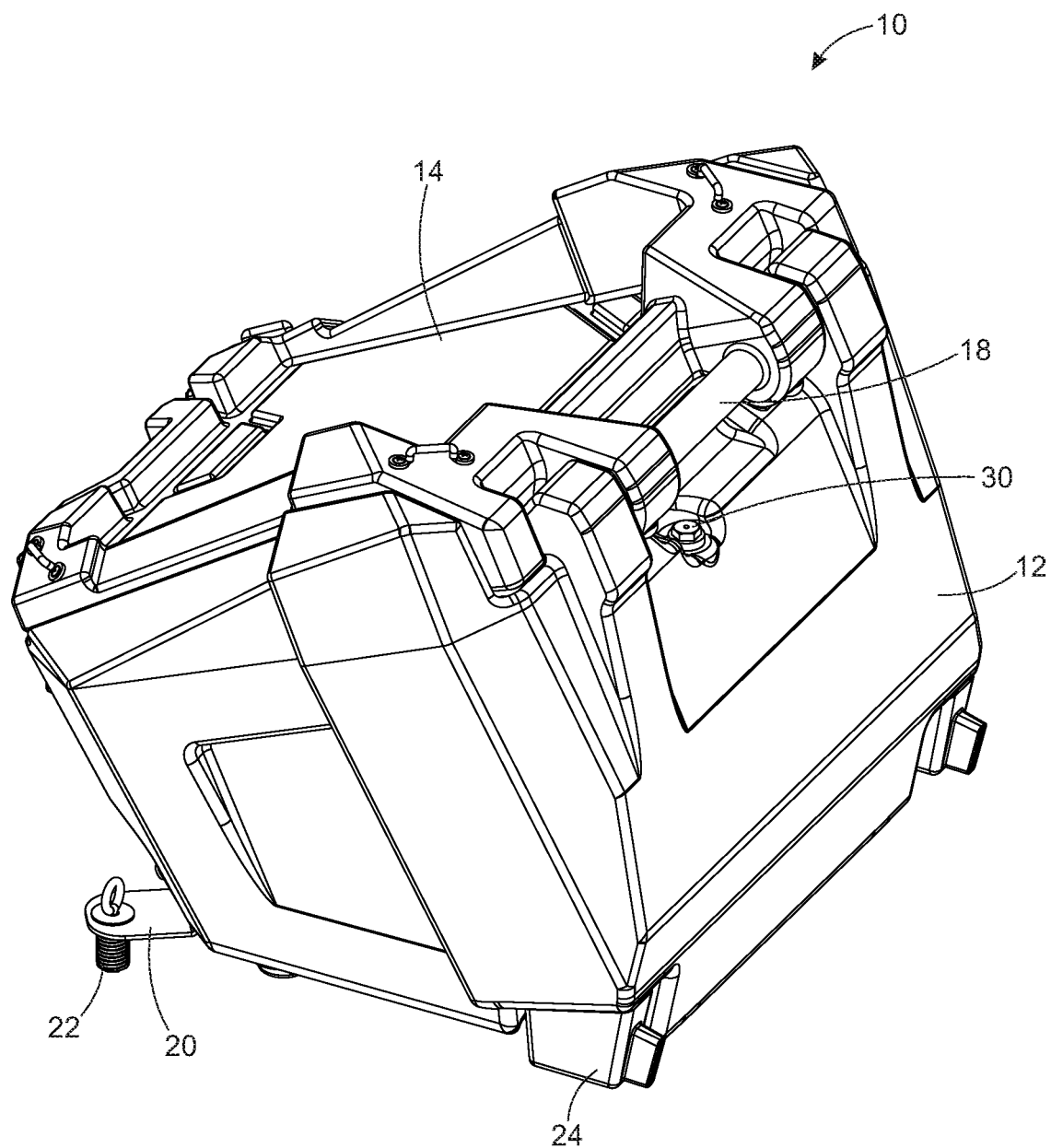
FIG. 3 is a top rear perspective view of a UTV spare fuel tank with storage showing a lid in a closed position according to an embodiment.
Figure 4:
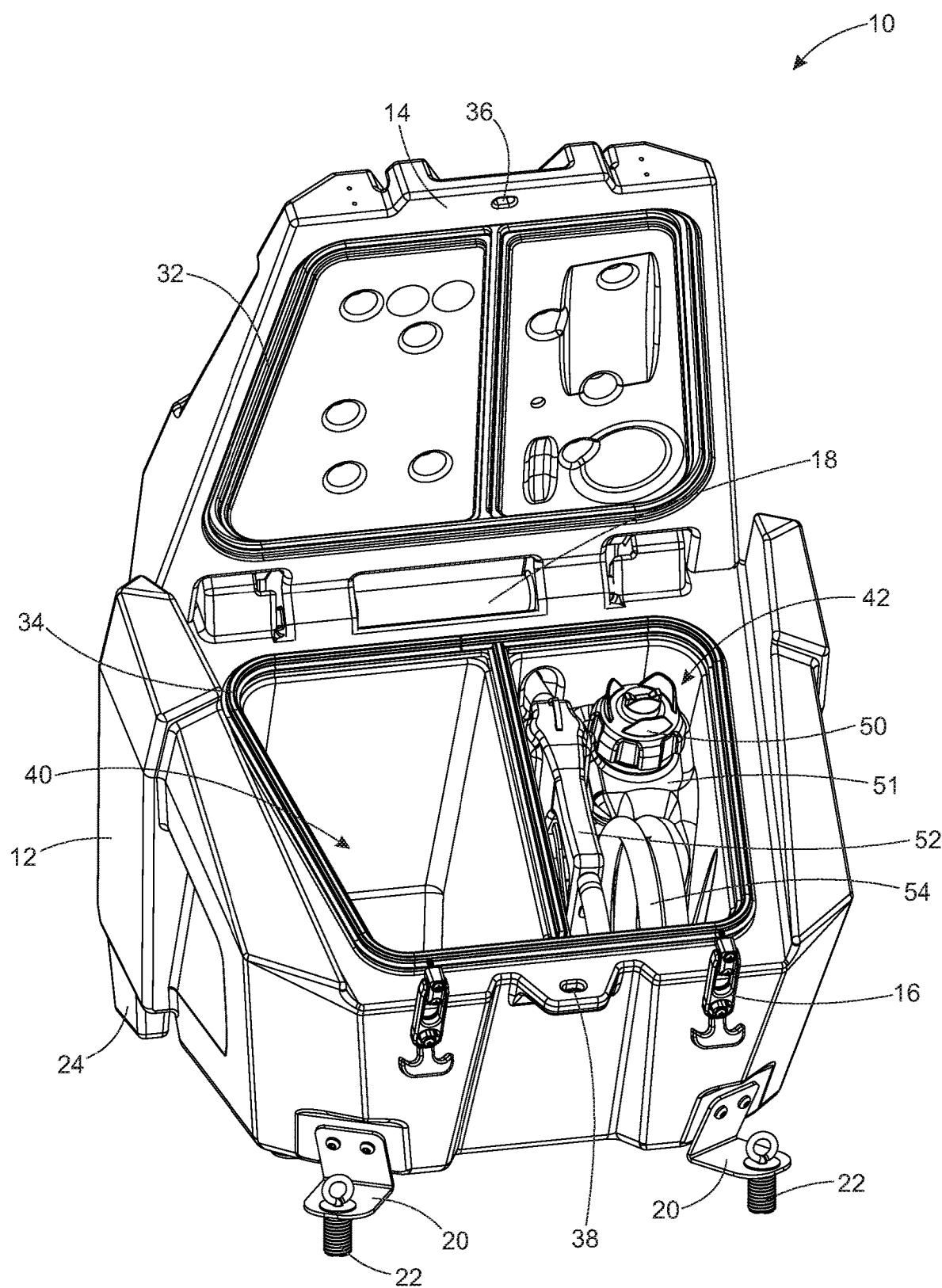
FIG. 4 is a top front perspective view of a UTV spare fuel tank with storage showing a lid in an open position according to an embodiment.

FIGS. 1-6 depict various views of a UTV spare fuel tank with storage 10 according to an embodiment. Generally, the spare fuel tank 10 includes a main body 12, a lid 14 that is rotatably coupled to the main body 12 at a hinge 18 and may be secured in a closed position with latches 16 (as shown in FIGS. 1-3).

The lid 14 may be moved from a closed position (see FIGS. 1-3) to an open position (see FIG. 4) by rotation about hinge 18 coupled between the main body 12 and the lid 14. Moving the lid 14 to the open position provides access to a storage compartment 40 and also a fueling compartment 42. The storage compartment 40 may be an open space for placement of anything the operator of the UTV wishes to place within it. The fueling compartment 42 contains components needed for utilizing the fuel stored within the spare fuel tank. The fueling compartment retains a fuel cap 50 coupled to a fill pipe 51, a fuel nozzle 52 and a fuel hose 54. A seal member 32 on the lid 14 corresponds to a seal member 34 on the main body 12, thereby creating a seal between the lid 14 and the main body 12 when the lid 14 is in the closed position. Also, when in the closed position lock aperture 36 on the lid and lock aperture 38 on the main body 12 may be aligned such that a lock may be extended through the apertures 36 and 38 in order to lock the lid 14 in the closed position.

Figure 5:
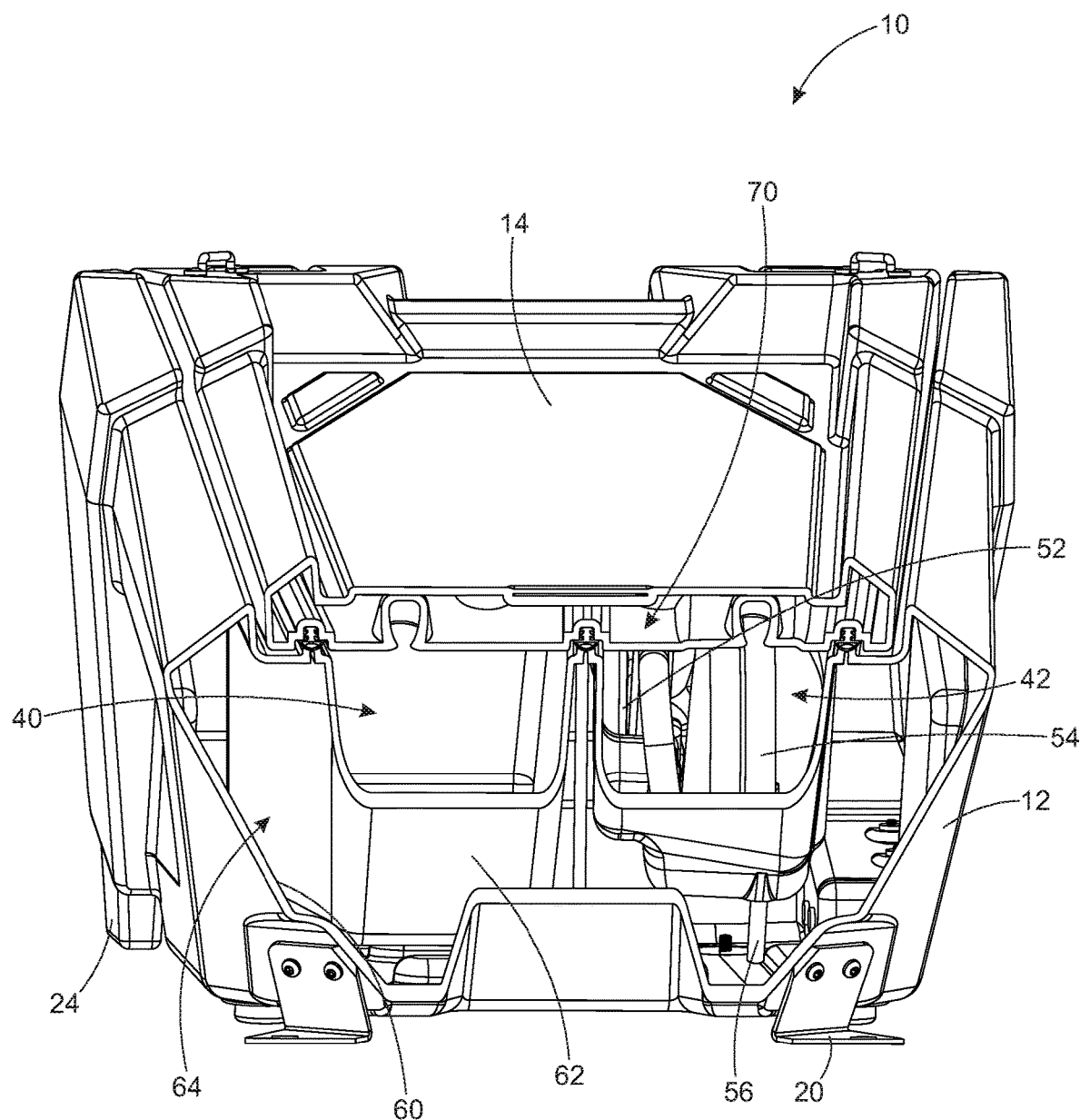
FIG. 5 is a section view of a UTV spare fuel tank with storage according to an embodiment.
Figure 6:
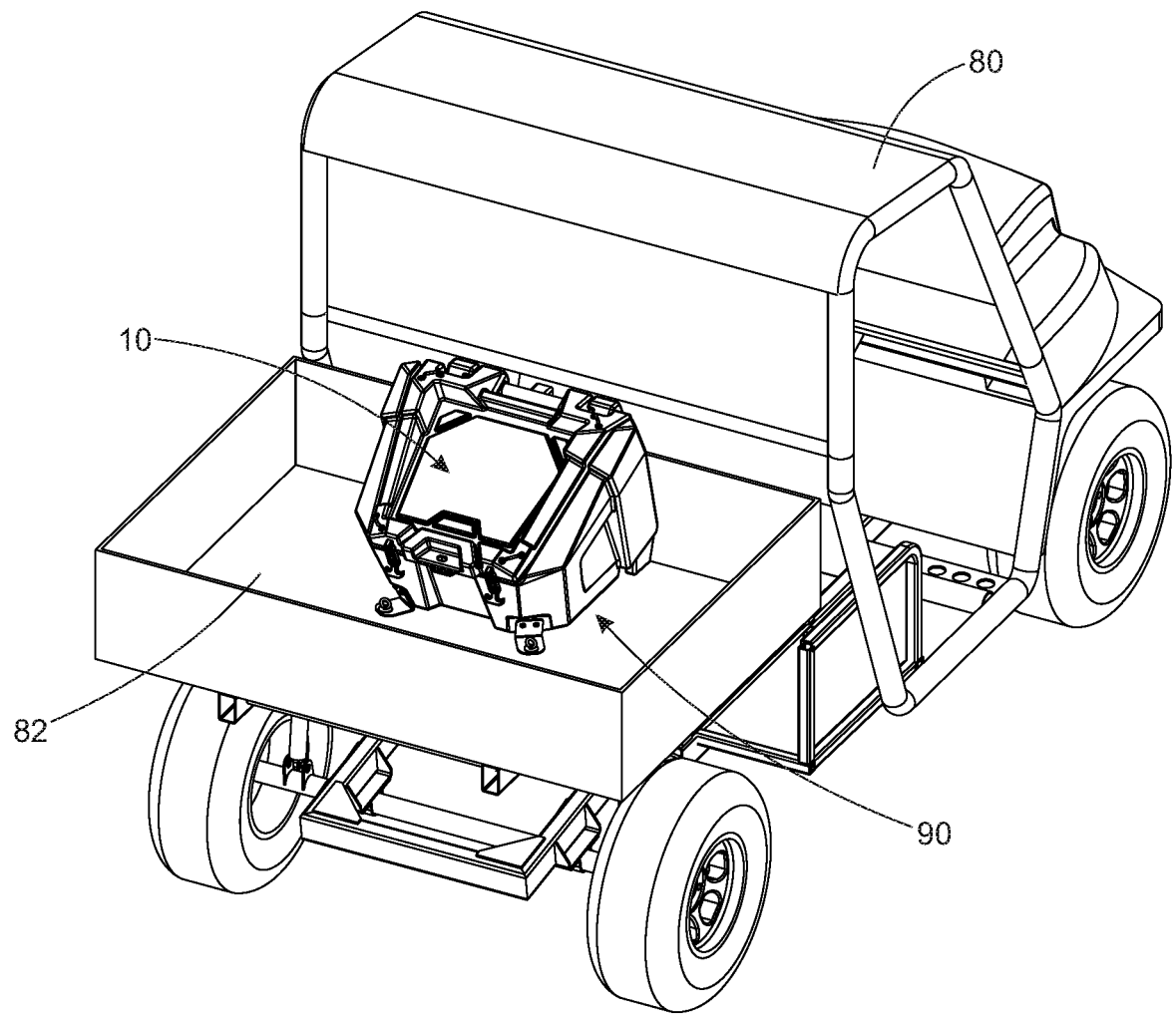
FIG. 6 is a perspective view of a UTV spare fuel tank with storage mounted to a UTV according to an embodiment.

The lid 14 may be a double wall to provide insulation to the storage compartment 40 and the fueling compartment 42. As shown in FIG. 5, the main body 12 includes a fuel reservoir 64 formed between an outer wall 60 and an inner wall 62. The outer wall 60 forms the outer dimension of the main body 12 and the inner wall 62 forms the storage compartment 40 and the fueling compartment 42. In embodiments, the main body 12 may be formed as a unitary piece with access through a fill pipe 51. A fuel tube 56 extends into the fuel reservoir 64.

In operation, the fuel hose 54 may be operatively coupled to a fill tube 56 allowing the fuel nozzle 52 to operate to draw fuel from the fuel reservoir 64 formed in main body 12 through the fuel hose 54 from the fuel tube 56 extending into a fuel reservoir 64 of the main body 12 (see FIG. 5). Additionally, the main body 12 may include a grounding stud 30 that extends into the fuel within the main body 12 for grounding to the UTV to dissipate static buildup in the fuel. The fuel nozzle 52 and the fuel hose 54 operate to refuel the UTV without the need of moving the spare fuel tank 10 from a rear storage shelf of the UTV.

The main body may include mounting brackets 20 coupled to the main body and extending below a bottom surface 13 of the main body 12. Additionally, the bottom surface 13 of the main body 12 may include feet 26 extending therefrom and rear mounting members 24. The brackets 20, rear mounting members 24 and feet 26 may engage a storage shelf 82 of a UTV 80 and wherein the feet 26 operate to lift the main body 12 of the spare fuel tank 10 off of the storage shelf 82 of the UTV 80 to create gap 90 while the brackets 20 and the rear mounting members 24 operate to couple the main body 12 of the UTV spare fuel tank 10 to the storage shelf 82. The gap 90 between the main body 12 and the storage shelf 82 of the UTV 80 operates to insulate the spare fuel tank 10 from the heat of the engine below the storage shelf 82, thereby reducing or preventing the overheating of the fuel within the spare fuel tank 10 and preventing combustion of the fuel within the spare fuel tank 10, preventing damage to the fuel tank 10 and the like. Connectors 22 may be used to secure the brackets 20 to the shelf 82, while the rear mounting members 24 slide into slots on the UTV to prevent the spare fuel tank 10 from moving during operation of the UTV, particularly over rough or steep terrain. It will be understood that various brackets 20 may be utilized dependent on the make and model of UTV for coupling the spare fuel tank 10 to the shelf 82.

The components of the UTV spare fuel tank 10 may generally be formed of plastic or other type of similar polymer. However, it will be understood that the components defining any UTV spare fuel tank 10 may be formed of any of many different types of materials or combinations thereof that can readily be formed into shaped objects provided that the components selected are consistent with the intended operation of a UTV spare fuel tank. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any UTV spare fuel tank 10 may be purchased pre-manufactured or manufactured separately and then assembled together. However, any or all of the components may be manufactured simultaneously and integrally joined with one another. Manufacture of these components separately or simultaneously may involve rotational molding, extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A UTV spare fuel tank comprising:
    a main body and a lid coupled to the main body, the lid moveable between a closed position and an open position;
    a storage compartment and a fueling compartment formed in the main body, the storage and fueling compartments accessible when the lid is in the open position;
    a fuel reservoir formed between an outer wall and an inner wall of the main body, wherein the outer wall forms the outer dimension of the main body and the inner wall forms the storage compartment and the fueling compartment; and
    brackets and lift members coupled to the main body and extending below a bottom surface of the main body, wherein the bottom surface of the main body is lifted off of a storage shelf of a UTV by the brackets and the lift members to form a gap between the bottom surface and the storage shelf for insulating the main body.

2. The fuel tank of claim 1, wherein the fueling compartment comprises a fuel cap coupled to a fill tube extending into the fuel reservoir.

3. The fuel tank of claim 2, wherein the fueling compartment retains a fuel nozzle and a fuel hose.

4. The fuel tank of claim 3, wherein the fuel hose is removably operatively coupled between the fill tube and the fuel nozzle, wherein the fuel nozzle operates to draw fuel from the fuel reservoir formed in main body through the fuel hose from the fuel tube extending into a fuel reservoir of the main body.

5. The fuel tank of claim 1, wherein the main body further comprises a grounding stud extending into the fuel reservoir of the main body for grounding to the UTV to dissipate static buildup in fuel within the fuel reservoir.

6. The fuel tank of claim 1, further comprising a seal member on the lid.

7. The fuel tank of claim 6, further comprising a seal member on the main body, wherein the seal member on the main body corresponds to the seal member on the lid to create a seal between the lid and the main body when the lid is in the closed position.

8. The fuel tank of claim 1, wherein the lid further comprises a lock aperture and the main body comprises a lock aperture aligned with the lock aperture of the lid when the lid is in the closed position.

9. The fuel tank of claim 1, wherein the lid comprises a double wall to provide insulation to the storage compartment and the fueling compartment.

10. The fuel tank of claim 1, wherein the main body is formed as a unitary piece.

* * * * *